Aug. 25, 1936.   C. Q. McW. CAMPBELL   2,051,983
PROCESS FOR THE PREPARATION OF SOLS FOR CLARIFYING LIQUIDS
Filed Aug. 1, 1931
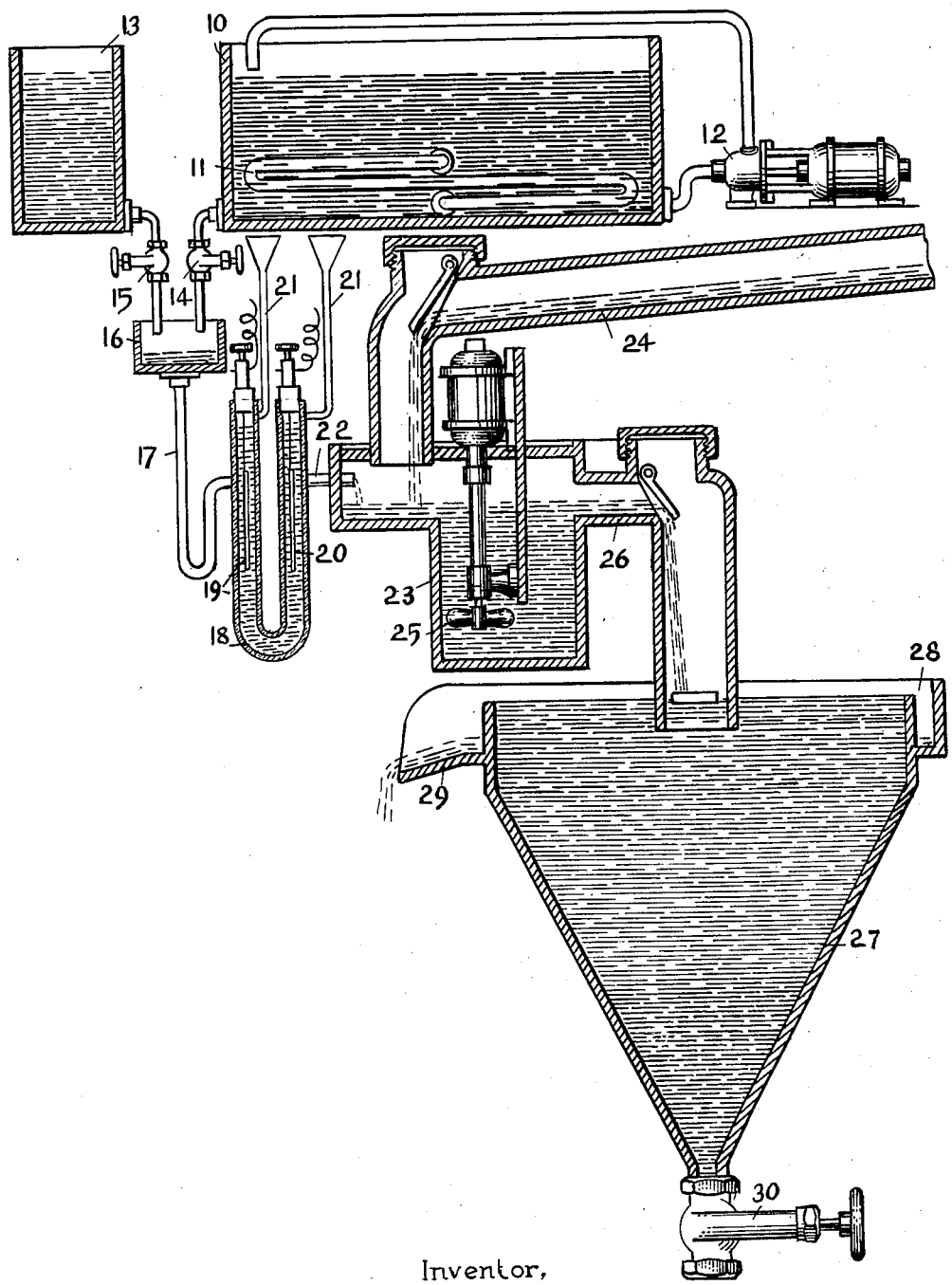
Inventor,
Curtis Quincy McWilliams Campbell,
By Samuel W. Balch
Attorney.

Patented Aug. 25, 1936

2,051,983

UNITED STATES PATENT OFFICE 2,051,983

PROCESS FOR THE PREPARATION OF SOLS FOR CLARIFYING LIQUIDS

Curtis Quincy McWilliams Campbell, Pittsburgh, Pa.

Application August 1, 1931, Serial No. 554,486

6 Claims. (Cl. 204—1)

The object of this invention is to provide a sol or coagulant for effecting the concentration and separation of substances such as fine coal, clays, flue dust or other materials in suspension in wash waters or other waters or liquids containing solid matters which are carried in suspension or in emulsion, such as still waste, water from all kinds of cleaning plants as ore-reduction plants, wool-scouring plants and sewage. A further object is to destroy and remove acid forming bacteria such as bacillus coli and other living organic matter, and to change water of acid reaction to alkaline reaction or neutral condition.

In carrying out this invention, an aqueous mixture, one percentum, more or less, of amylaceous materials, as corn, wheat or potato starch, and an alkaline reagent, as three percentum, more or less, of sodium hydroxid in solution, is added. The foregoing steps are as set forth in my application Serial No. 450,303, filed May 6, 1930.

This sol or coagulant, in order to increase its electric charge and activity, is subjected to an electric current, either direct or alternating, thereby if direct current is used, setting free hydrogen at the negative electrode and oxygen at the positive electrode, or, if alternating current is used, setting free both gases at both electrodes. The hydrogen gas bubbles to the surface and escapes, and part or all of the oxygen is absorbed in the solution, and being in a nascent state is effective in the destruction of bacteria.

Referring to the accompanying sheet of drawing, which forms a part of this description, the figure shows diagrammatically in elevation a plant for carrying out this process.

A tank 10 is partially filled with a solution or suspension of amylaceous material, as a dispersion of cornstarch for example, of from one and one-half to ten percentum. In the tank are steam coils 11 by which the temperature is gradually raised. A circulating pump 12 draws the mixture from the bottom and returns it to the top, thereby insuring an even distribution of the starch throughout the water and a slow and uniform raising of the temperature. After the heat treatment it is further diluted if necessary. This heat treatment is useful in reducing the time necessary for the starch grains to absorb the water and swell, but if more time can be taken it is not essential. A second tank 13 contains an alkaline reagent, suitably a solution containing three to four percentum or more of sodium hydroxide. Through a valve 14 in a pipe leading from the tank of amylaceous material, and a valve 15 in a pipe leading from the tank of alkaline reagent the solutions are drawn in about equal proportions, or as desired, into a mixing tank 16 from which the mixture flows down a pipe 17 which maintains a static head and feeds the mixture into the upper end of one branch of a U-tube 18, which may have a diameter of one-half to one inch or more. In one of the branches is a negative electrode 19, and in the other branch is a positive electrode 20, or both electrodes will be positive and negative alternately if alternating current is used. A potential of about six volts is suitable, but other voltages may be employed. Pipes 21 are provided for the escape of the hydrogen. If direct current is used there will only be a pipe for the escape of hydrogen leading from the upper end of the branch of the U-tube which contains the negative electrode. Oxygen in a nascent state is set free at the positive electrode and is at once carried with the coagulating solution through a pipe 22 into a tank 23 into which the wash waters or sewage to be clarified is discharged from a pipe 24. A motor-driven agitator 25 and a mixing flume 26 brings the coagulating solution into intimate contact with all parts of the water to be clarified. From the mixing flume the water is discharged into a settling tank or cone 27 and from a skirt 28 around the upper edge of the cone the clarified water is discharged through a spout 29. The settled sludge is drawn from the cone through a valve 30 at the bottom.

By reason of the electrical treatment of the coagulating solution immediately before introduction into the water to be clarified it is found to be activated so that on introduction there is immediate coagulation and the formation of flocs. Also by reason of the electrical treatment the solution effects a marked reduction or almost complete destruction of bacteria.

I claim,—

1. The process of preparing a coagulant for the concentration of substances in suspension or in emulsion in water, which comprises preparing an aqueous dispersion containing about 1½% to 10% of starch, mixing therewith an alkaline reagent to form a coagulative mixture, and passing an electric current through the mixture to increase its activity substantially without converting the starch.

2. The process of preparing a sol for the purification of impure water containing substances in suspension or in emulsion therein, which comprises preparing an aqueous dispersion containing about 1½% to 10% of starch, preparing an aqueous solution containing about 3% or more of caustic soda, mixing the starch dispersion with the alkaline solution, and passing an electric current therethrough.

3. The process of concentrating substances in suspension or in emulsion in water, which comprises preparing an aqueous dispersion containing about 1½% to 10% of starch, mixing therewith an alkaline reagent, passing an electric current through the coagulant thereby produced to increase its activity substantially without degenerating the starch, adding the coagulant to water containing the substances to be concentrated, and decanting purified water from the concentrated substances.

4. The process of treating impure water containing substances in suspension or in emulsion, which comprises preparing an aqueous dispersion containing about 1½% to 10% of starch, preparing an aqueous solution containing about 3% or more of caustic soda, mixing the starch dispersion with the alkaline solution, passing an electric current through the mixture to increase its activity and dissolve oxygen therein, adding the mixture to the impure water, allowing the impurities concentrated by the electrically-treated mixture to settle, and separately withdrawing purified water and impurities removed therefrom.

5. The process of preparing sols for the concentration of substances in suspension or in emulsion in water, which comprises preparing an aqueous dispersion containing at least 1½ per cent of starch, agitating the dispersion to prevent separation of the starch, raising the temperature of the dispersion to expand the starch cells substantially without rupturing them, combining the dispersion with an alkaline reagent to form a coagulative sol, and passing an electric current through the sol to activate it.

6. The process of treating aqueous wastes containing substances in suspension or in emulsion, which comprises forming an aqueous dispersion of starch, agitating the dispersion with an alkaline solution to form a coagulative sol, passing an electric current through the sol to activate it and to dissolve oxygen therein, mixing the sol containing dissolved oxygen with the aqueous waste, and withdrawing clarified waste of reduced bacterial content from concentrated substances separated therefrom by the sol.

CURTIS QUINCY McWILLIAMS CAMPBELL.